US008851771B2

(12) United States Patent
Kaliebe et al.

(10) Patent No.: US 8,851,771 B2
(45) Date of Patent: Oct. 7, 2014

(54) WIPEABLE KEYBOARD COVER

(75) Inventors: Craig Kaliebe, Brookfield, WI (US);
Greg Zawislak, Roscoe, IL (US); Mark Bondzinski, Des Plaines, IL (US)

(73) Assignee: ZF Friedrichshafen AG, Friedrichshafen (DE)

( * ) Notice: Subject to any disclaimer, the term of this patent is extended or adjusted under 35 U.S.C. 154(b) by 80 days.

(21) Appl. No.: 13/331,681

(22) Filed: Dec. 20, 2011

(65) Prior Publication Data

US 2013/0156482 A1   Jun. 20, 2013

(51) Int. Cl.
*B41J 5/10* (2006.01)
*B41J 5/00* (2006.01)
*B41J 11/62* (2006.01)

(52) U.S. Cl.
USPC .............................. 400/490; 400/472; 400/714

(58) Field of Classification Search
CPC .............. B41J 29/12; B41J 5/102; B41J 5/10; G06F 2203/04809
USPC ........................................... 400/714, 472, 490
See application file for complete search history.

(56) References Cited

U.S. PATENT DOCUMENTS

| | | | |
|---|---|---|---|
| 5,021,638 A | 6/1991 | Nopper et al. | |
| 5,551,497 A * | 9/1996 | Stanley | 150/154 |
| 6,705,787 B2 | 3/2004 | Jeffries et al. | |
| D503,936 S | 4/2005 | Tritschler et al. | |
| 6,887,002 B1 | 5/2005 | Chen | |
| 6,962,454 B1 * | 11/2005 | Costello | 400/713 |
| 7,033,098 B2 | 4/2006 | Linyear et al. | |
| 7,557,312 B2 * | 7/2009 | Clark et al. | 200/5 A |
| 2003/0002910 A1 * | 1/2003 | Jeffries et al. | 400/714 |
| 2007/0264072 A1 * | 11/2007 | Chen | 400/472 |
| 2008/0216681 A1 * | 9/2008 | Shaw et al. | 101/128.1 |

FOREIGN PATENT DOCUMENTS

| | | | |
|---|---|---|---|
| FR | 2912039 A1 * | 8/2008 | |
| JP | 03186310 A * | 8/1991 | |

OTHER PUBLICATIONS

Author: Blue Sea Systems Title: Technical Brief—IP (Ingress Protection) Ratings, Date: Feb. 14, 2006 (see attached document properties image screenshot) Published at: http://assets.bluesea.com/files/resources/technical_briefs/Technical%20Brief_IP%20Ratings.pdf.*
www.man-machine.com.
http://www.esterline.com/advancedinput/productsLiterature/medigenicKeyboard/tabid/1764/default.aspx.
http://www.protectcovers.com/.
http://www.protectcovers.com/index.php/keyboard-covers/cherry-keyboard-covers/cherry-g84-4100-kb-cover-1.html.
http://store.sealshield.com/seal-touch-glow2--keyboard-p141.aspx.
http://www.unotron.com/us/products.html.
http://www.wetkeys.com/.

* cited by examiner

*Primary Examiner* — Daniel J Colilla
*Assistant Examiner* — John M Royston
(74) *Attorney, Agent, or Firm* — Brinks Gilson & Lione

(57) ABSTRACT

A wipeable keyboard cover may include a flat, flexible membrane surrounded by a rigid frame that closely fits a keyboard assembly. The wipeable keyboard cover may be securely attached to the keyboard assembly and may be easily removed from the keyboard assembly by a user. The wipeable keyboard cover may prevent foreign matter from contacting the covered portion of the keyboard assembly while allowing easy operation of the keyboard assembly. The flat nature of the wipeable keyboard cover may allow the cover to be cleaned effectively while it is attached to a keyboard assembly without subjecting the underlying keyboard assembly to potentially harmful treatment.

19 Claims, 6 Drawing Sheets

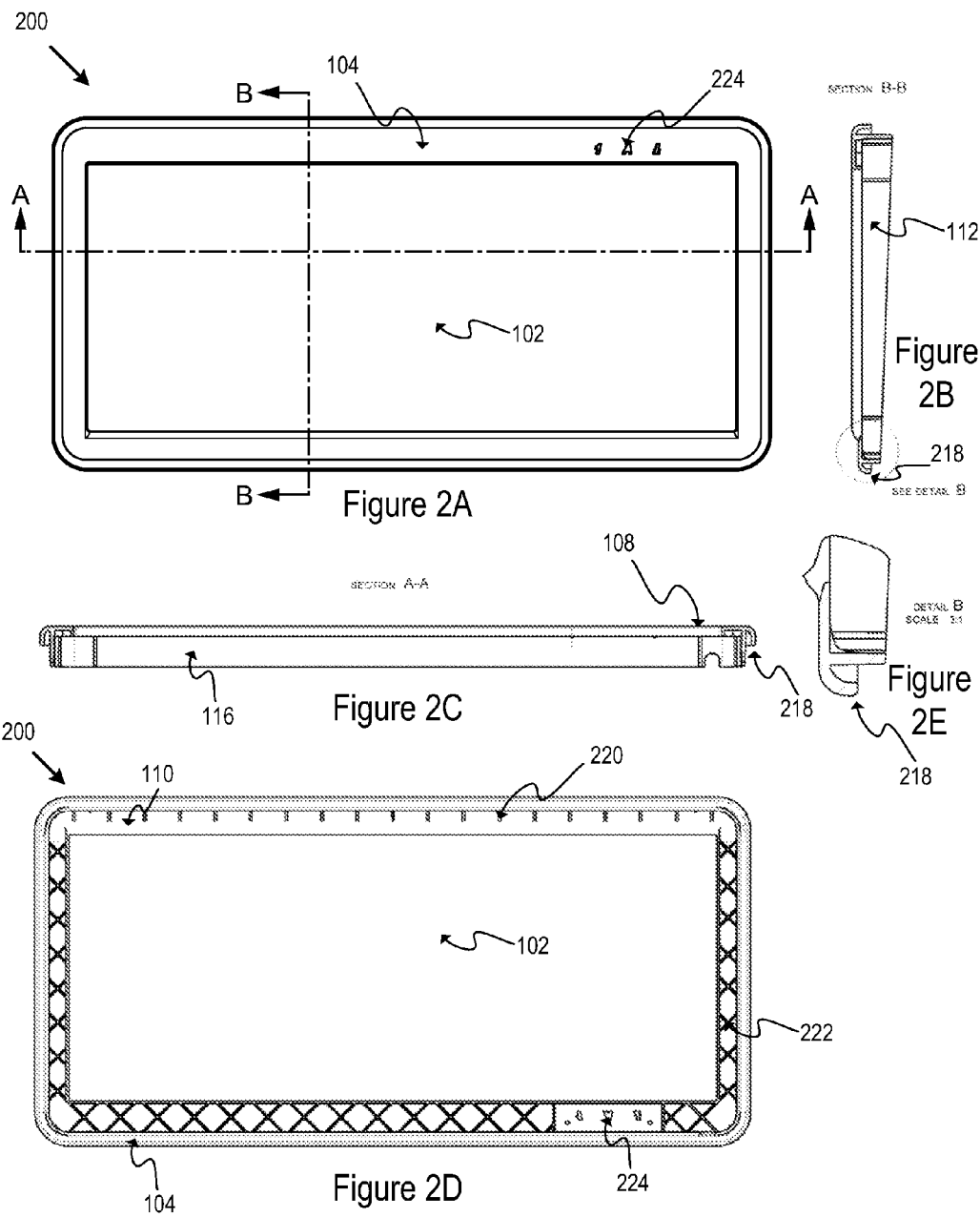

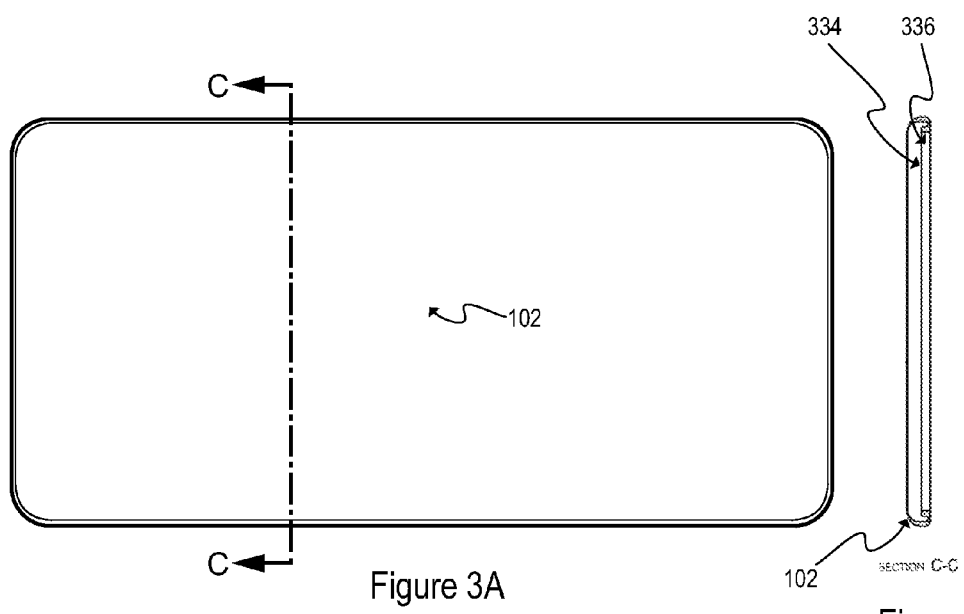
Figure 3A
Figure 3B
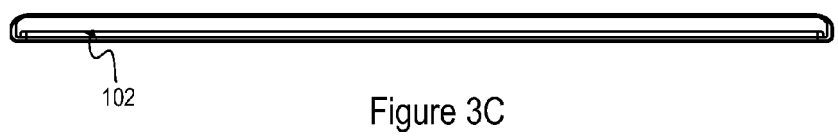
Figure 3C

WIPEABLE KEYBOARD COVER

BACKGROUND OF THE INVENTION

1. Field of the Invention

The invention relates to a keyboard assembly cover. In particular, the invention relates to a keyboard cover that enables easy operation of a keyboard while protecting the keyboard assembly from contamination and allowing effective cleaning of the cover.

2. Related Art

Keyboards are used as input devices for a wide variety of machines, including computers, telephones, and office equipment. Keyboards generally include an array of separate keys that can be depressed by a user to activate a machine. Users introduce foreign material, such as dirt, liquids, germs, bacteria, and other contaminants, to the keyboard when they touch the keys. Keyboards in public spaces or keyboards operated by multiple users may contain a higher quantity of contaminates due to the large number of users. It is desirable to remove the contaminants from the keyboards, but effective cleaning is difficult due to the many contours of the keys and the spaces between the keys.

Keyboard covers exist that are formed to match the contours of the keys, but they are difficult to clean effectively. Other keyboard covers fit loosely over the keyboard, but they easily fall off the keyboard and do not adequately protect against contamination. Still other keyboard covers rigidly cover the entire keyboard assembly, but they do not allow for operation of the keyboard in the covered state.

Thus, there is a need for a keyboard cover that prevents contamination of the keys, enables effective cleaning of the cover, and provides easy use of the keyboard.

SUMMARY OF THE INVENTION

The descriptions below include apparatuses for covering a keyboard assembly. A wipeable keyboard cover may prevent foreign matter from contacting the covered portion of the keyboard assembly while enabling easy operation of the keyboard assembly. A wipeable keyboard cover may also allow for effective cleaning of the cover while it is attached to a keyboard assembly without subjecting the underlying keyboard assembly to potentially harmful treatment. Thus, the wipeable keyboard cover may provide improvements in maintaining the cleanliness of keyboards.

According to one embodiment of the invention, a cover, designed for a keyboard assembly having a plurality of keys and an upper and lower housing, comprises a membrane extending over the plurality of keys, where the membrane is flexibly adaptable to allow the keys to be depressed through the membrane, and a rigid frame attached to an entire periphery of the membrane.

According to another embodiment of the invention, a method of creating a cover for a keyboard assembly having a plurality of keys and a housing, where the method comprises the steps of forming a rigid frame configured to surround the outer perimeter of the housing; and attaching a periphery of a flexible membrane to the rigid frame, wherein the flexible membrane is configured to cover the plurality of keys.

Other systems, methods features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The embodiments described below may be more fully understood by reading the following description in conjunction with the drawings, in which

FIG. 2A is a plan view of a wipeable keyboard cover according to another embodiment of the invention;

FIG. 2B is a cross-sectional side view of the wipeable keyboard cover of FIG. 2A;

FIG. 2C is a cross-sectional elevation view of the wipeable keyboard cover of FIG. 2A;

FIG. 2D is an bottom plan view of the wipeable keyboard cover of FIG. 2A;

FIG. 3A is a plan view of an aspect of a wipeable keyboard cover according to another embodiment of the invention;

FIG. 3B is a cross-sectional side view of an aspect of a wipeable keyboard cover of FIG. 3A according to another embodiment of the invention;

FIG. 3C is an elevation view of an aspect of a wipeable keyboard cover according to another embodiment of the invention;

DETAILED DESCRIPTION

Figure 1A:
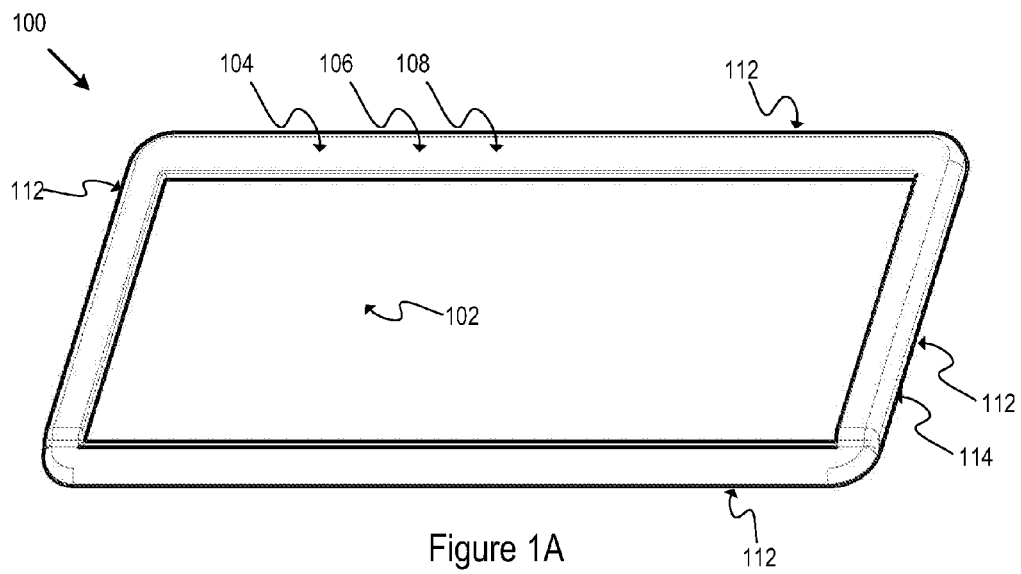
FIG. 1A is a perspective view of a wipeable keyboard cover according to one embodiment of the invention.
Figure 1B:
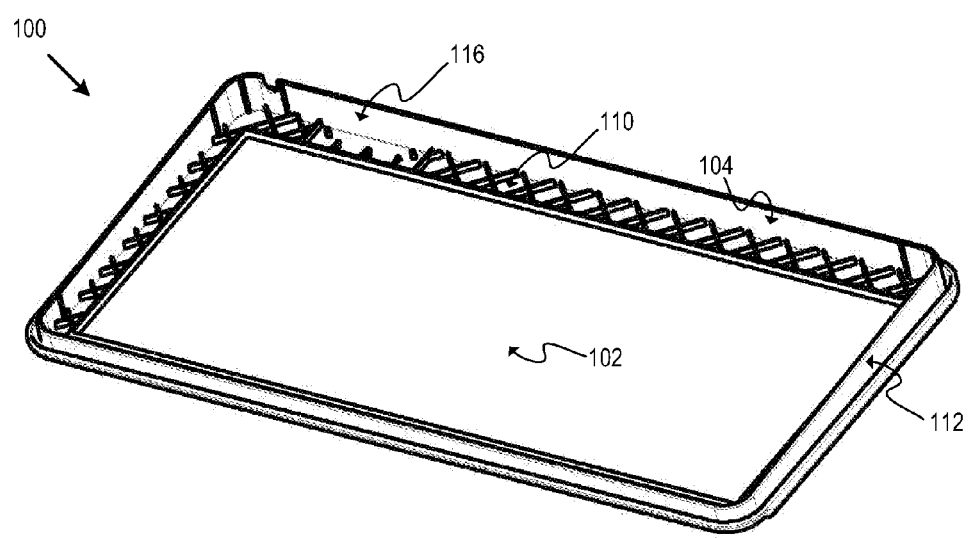
FIG. 1B is an alternate perspective view of the wipeable keyboard cover of FIG. 1A.

FIGS. 1A and 1B illustrate a wipeable keyboard cover 100 according to an embodiment of the invention. FIG. 1A shows a perspective view of wipeable keyboard 100. FIG. 1B shows an alternate perspective view of wipeable keyboard cover 100. Wipeable keyboard cover 100 may be used to cover a keyboard assembly (not shown). Keyboard assemblies are well known the art. A keyboard assembly may include a housing and a plurality of keys. The housing may be divided into an upper housing and a lower housing. The upper housing and lower housing may be combined to form the keyboard assembly. The plurality of keys may be partially contained in the upper housing. The plurality of keys may include some or all keys that are raised above the upper housing. The plurality of keys may include some or all keys that are relatively flat with respect to the upper housing. The keyboard assembly may include the features and take the form of any other keyboard known in the art. Wipeable keyboard cover 100 may be adapted for use with any keyboard assembly.

Wipeable keyboard cover 100 may cover a keyboard assembly when it is combined with the keyboard assembly. Wipeable keyboard cover 100 may allow a user to operate a keyboard assembly without removing wipeable keyboard cover 100 and without direct physical contact with the keyboard assembly. A user may depress wipeable keyboard cover 100 in an area above a particular key to activate the key.

Wipeable keyboard cover 100 may be designed to fit tightly around and cover the entire upper housing or top portion of the keyboard assembly. Wipeable keyboard cover 100 may substantially prevent particles, dust, spilled liquids, contaminants, germs, bacteria, viruses, and other matter from contacting the covered portion of the keyboard assembly when wipeable keyboard cover 100 is combined with the keyboard assembly. Preferably, wipeable keyboard cover 100 may have an ingress protection rating of at least 54 when it is attached to a keyboard assembly. Ingress protection ratings are commonly known in the enclosure and environmental protection arts. The first digit of the ingress protection rating indicates the level of protection against solid objects, while the second digit indicates the level of protection against liquids. In general, higher numbers indicate greater levels of protection. Alternatively, wipeable keyboard cover 100 may have a higher or lower ingress protection rating.

The exposed surface of wipeable keyboard cover 100 may be effectively cleaned while it is attached to a keyboard assembly without subjecting the underlying keyboard assembly to potentially harmful treatment, such as depositing liquid or other debris on the keyboard assembly. The substantially smooth and flat shape of wipeable keyboard cover 100 may easily allow the surface to be effectively wiped clean of any material located on the exposed surface. Wipeable keyboard cover 100 may be cleaned by known methods, such as, for example, antibacterial soap and water, sterile alcohol wipes commonly used for cleaning medical devices, Milton™ sterilizing swipes, Mikrozid AF™ liquid, Sterets Alcowipe™, phenolic disinfectant, 10% sodium hypochlorite solution, isopropanol based cleaning fluids, pure alcohol, or Cidex OPA™ solution. Depending on the materials used to construct wipeable keyboard cover 100, care should be taken when selecting a cleaning method to prevent damaging wipeable keyboard cover 100. For example, if wipeable keyboard cover 100 includes silicon material, then petroleum based cleaning fluids, acetone, solutions with bleach, and high temperature sterilization may damage wipeable keyboard cover 100.

Wipeable keyboard cover 100 includes membrane 102 and frame 104. Membrane 102 may be permanently or temporarily attached to frame 104. Membrane 102 may overlay and cover a plurality of keys on a keyboard assembly when wipeable keyboard cover 100 is attached to the keyboard assembly. Membrane 102 may be sized to extend over the entire plurality of keys. Alternatively, membrane 102 may be sized to extend over only a portion of the plurality of keys. Preferably, membrane 102 may be substantially flat as it overlays the plurality of keys. Membrane 102 may be positioned to contact only the top surface of the keys when wipeable keyboard cover 100 is attached with a keyboard assembly. Membrane 102 may be positioned to avoid contacting the side surfaces of the plurality of keys absent user action, such as depressing a key. Alternatively, membrane 102 may be designed to form around and contact any surface of the plurality of keys even when the user is not depressing the keys.

Membrane 102 may be composed of a flexible material that allows a user to operate a covered keyboard assembly without removing wipeable keyboard cover 100. Membrane 102 may be composed of, for example, silicon, latex, urethane, plastic, rubber, or any other known flexible material. Membrane 102 may be formed by known processes, such as, injection mold, hot-iron press, or any other suitable formation method. Membrane 102 may be any thickness, but preferably portions of membrane 102 have a thickness between or equal to 0.3 and 0.4 millimeters. Some portions of membrane 102 may be of a thickness greater than other portions.

Membrane 102 may temporarily deform when force is applied, such as by a user's finger, and may substantially return to its original shape after the applied force is removed. Membrane 102 may allow a user to depress individual keys or a plurality of keys while operating the covered keyboard assembly. Membrane 102 may allow users to experience substantially the tactile feel of the covered keyboard assembly while operating a keyboard assembly combined with wipeable keyboard cover 100. Attaching wipeable keyboard cover 100 to a keyboard assembly may permit the normal operation of the keyboard assembly in a way that does not substantially increase the difficulty of operating the keyboard assembly. Membrane 102 may be designed for an extended operational life, such as, for example, five million key, or two years of typical use.

Membrane 102 may allow a user to view the covered plurality of keys when wipeable keyboard cover 100 is attached to a keyboard assembly. Preferably, membrane 102 may be composed of material that is substantially transparent or translucent. Alternatively, membrane 102 may be composed of opaque material. Membrane 102 may be pigmented or tinted with any known color. The color of membrane 102 may be varied depending on the application of wipeable keyboard cover 100. Membrane 102 may include a coating on an outer surface or an inner surface. Membrane 102 may include a variety of coatings, such as, for example, an antimicrobial coating, a slick coating, or an ultraviolet protective coating.

Frame 104 may extend around the entire periphery of membrane 102, as shown in FIGS. 1A and 1B. Alternatively, frame 104 may extend around only a portion of membrane 102. Frame 104 may be more rigid than membrane 102. Frame 104 may be composed of materials, such as, for example, graphite, metal, fiber, plastic, polystyrene, polycarbonate, or acrylonitrile butadiene styrene. Frame 104 may be composed of the same material as the keyboard assembly to which wipeable keyboard cover 100 is attached. Frame 104 may be pigmented or tinted with any known color. Frame 104 may be opaque or may be substantially transparent or translucent. The color of frame 104 may be varied depending on the application of wipeable keyboard cover 100. The color of frame 104 may match the color of the covered keyboard assembly or may be dissimilar to the color of the covered keyboard assembly.

The shape of frame 104 may define the shape of membrane 102. Frame 104 may cause membrane 102 to remain substantially flat. Preferably, frame 104 may be sized to allow the entire plurality of keys to be covered by membrane 102 when wipeable keyboard cover 100 is attached to a keyboard assembly. Alternatively, frame 104 may cover only a portion of the plurality of keys when wipeable keyboard cover 100 is attached to a keyboard assembly.

Referring to FIGS. 1A and 1B, frame 104 may include a top section 106 with an upper-surface 108 and an under-surface 110. Frame 104 may also include four side sections 112 with outside surfaces 114 and inside surfaces 116. Side sections 112 may be oriented perpendicular to top section 106. Under-surface 110 and inside surfaces 116 of frame 104 may contact the keyboard assembly when wipeable keyboard cover 100 is attached to the keyboard assembly.

FIGS. 2A, 2B, 2C, and 2D show plan, side, elevation, and bottom plan views, respectively, of another embodiment of the invention. Wipeable keyboard cover 200 may include some or all of the same elements as wipeable keyboard 100. Similar elements will be referred to using the designations from FIGS. 1A and 1B. The entire periphery of membrane 102 may attach to frame 104. Membrane 102 may be permanently or temporarily attached to frame 104. Preferably, membrane 102 may include a channel formed into its periphery (see FIGS. 3A, 3B, and 3C). Frame 104 may include an edge 218 in side sections 112 or may include an edge 218 in top section 106. Edge 218 may be formed along the exterior circumference of side section 112. Edge 218 may be best shown in FIGS. 2B, 2C, and FIG. 2B Detail B. Edge 218 may be sized to fit the channel formed in membrane 102. Membrane 102 may be attached to frame 104 by inserting edge 218 into the channel formed in the periphery of membrane 102. Preferably, membrane 102 may extend over upper-surface 108 before edge 218 is inserted into the channel formed in the periphery of membrane 102. Alternatively, edge 218 may be formed along an interior circumference of frame 104, in which case edge 218 may be inserted into the channel formed in the periphery of membrane 102 without membrane 102 extending over upper-surface 108. Alternatively, membrane 102 may attach to frame 104 through other known fastening methods including, for example, adhesive, heat staking, interference fit or mechanical fasteners, such as staples, rivets, hook and loop tape, or any other known fastening method.

Wipeable keyboard cover 200 may be removably attached to a keyboard assembly. Wipeable keyboard cover 200 may securely fit and may be attached in a way that prevents unintentional removal from the keyboard assembly when it is attached to a keyboard assembly. Wipeable keyboard assembly 200 also may be attached in a way that permits removal from the keyboard assembly by an intentional action, such as by a user manually separating wipeable keyboard cover 200 from the keyboard assembly.

Frame 104 may include a plurality of ribs 220 on inside surface 116 of side sections 112. Ribs 220 may be oriented substantially perpendicular to the longest dimension of side sections 112, as shown in FIG. 2D. Ribs 220 may extend in the height direction of side sections 112. Ribs 220 may be included on any combination or all of side sections 112. Ribs 220 may be formed integrally with frame 104 or may be attached to frame 104. Ribs 220 may be composed of the same materials as frame 104. A portion of the plurality of ribs 220 may be designed to be deformable. The shape of deformable ribs 220 may distort when a force is applied to deformable ribs 220, such as when wipeable keyboard cover 200 is attached to a keyboard assembly and the keyboard housing contacts deformable ribs 220. The remaining portion of the plurality of ribs 220 may be more rigid than the deformable ribs 220.

Wipeable keyboard cover 200 may attach to a keyboard assembly with a snap fit. A snap fit, as is commonly known in the art, may occur when a portion of one part bends or deforms to accommodate the shape of another part. The deformation may be caused by interference between the parts when they are fit together. An interference may occur between frame 104 and the housing of a keyboard assembly when wipeable keyboard cover 200 is place over and attached to the keyboard assembly. For example, the shape of deformable ribs 220 may distort upon contact with the housing of the keyboard assembly. Deformable ribs 220 may remain distorted while wipeable keyboard cover 200 is attached to a keyboard assembly, providing wipeable keyboard cover 200 a secure hold on the keyboard assembly. Wipeable keyboard cover may be attached in a way that permits a user to remove wipeable keyboard cover 200 from the keyboard assembly by applying force in the direction opposite of the interference between deformable ribs 220 and the keyboard housing. Wipeable keyboard cover 200 may be constructed in a way that accommodates attachment to and removal from a keyboard assembly many times throughout its operational life.

Wipeable keyboard cover 200 may include a plurality of bracing formations 222 to increase the strength or rigidity of frame 104. Bracing formations 222 may be formed integrally with frame 104 or may be attached to frame 104. Bracing formations 222 may be composed of the same materials as frame 104. Bracing formations 222 may be formed in a cross pattern on under-surface 110 of top section 106, as shown in FIG. 2D. Alternatively, bracing formations 222 may take any bracing shape known in the art and may be formed into any section of frame 104.

Wipeable keyboard cover 200 may include indicator signal viewer 224. Indicator signal viewer 224 may allow status indicator signals located on a keyboard assembly to be viewed by a user while wipeable keyboard cover 200 is attached to the keyboard assembly. Status indicator signals may include for example, capital letter lock, number lock, or shift lock indicator lights, or any other indicator signal located on the keyboard assembly. Indicator signal viewer 224 may be preferably located above the keyboard signals when wipeable keyboard cover 200 is attached to a keyboard assembly. Indicator signal viewer 224 may be located on frame 104, but it may alternatively be located on membrane 102. Indicator signal viewer 224 may be a transparent or translucent portion of frame 104 or membrane 102. Indicator signal viewer 224 may be attached to wipeable keyboard cover 200 by any commonly known method of attaching two molded parts, such as heat stake, slip fit, or interference fit.

FIGS. 3A, 3B, and 3C show plan, side, and elevation views, respectively, of an aspect of the invention. Membrane 102 may include channel 334 formed into its periphery. Channel 334 may be designed to accept edge 218 (see FIG. 2B) located on frame 104 (see FIGS. 2A, 2B, 2C, and 2D). Membrane 102 may be attached to frame 104 by inserting edge 218 into channel 334. Channel 334 may be formed in part by lip 336 extending around the inside periphery of membrane 102. Channel 334 may be any shape capable of accepting an edge, such as, for example, a U-shape, a V-shape, or an L-shape.

Figure 4A:
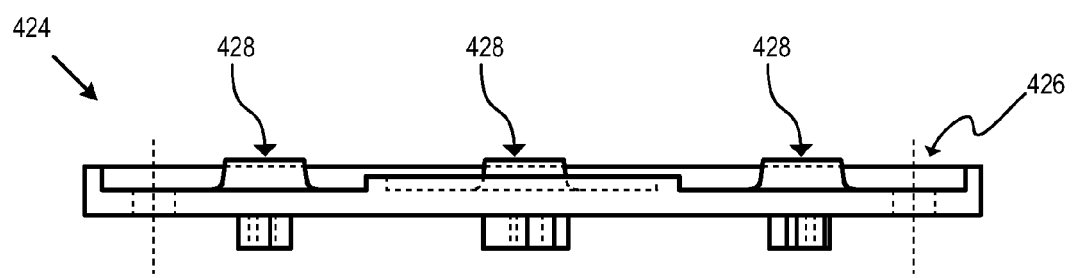
FIG. 4A is an elevation view of an aspect of a wipeable keyboard cover according to another embodiment of the invention.
Figure 4B:
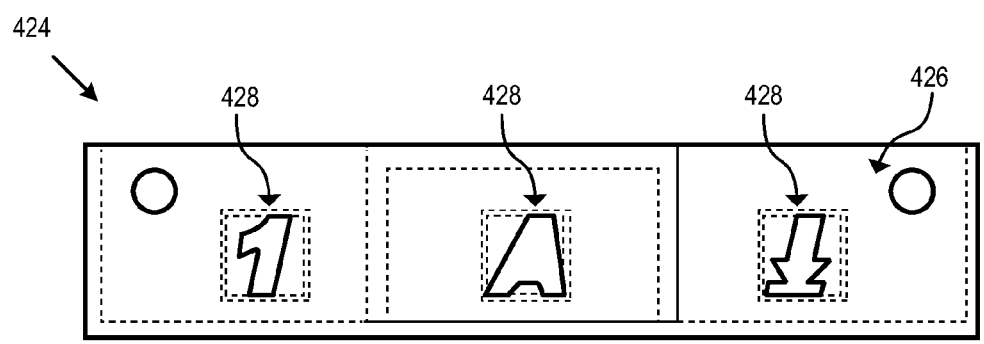
FIG. 4B is a plan view of the aspect of the wipeable keyboard cover of FIG. 4A.

FIGS. 4A and 4B show elevation and plan views, respectively, of an aspect of the invention. Indicator signal viewer 424 may include a housing 426 and a plurality of light transmitting elements 428. Housing 426 may encompass light transmitting elements 428. Light transmitting elements 428 may be preferably located above the keyboard signals when wipeable keyboard cover 200 is attached to a keyboard assembly. Light transmitting elements 428 may transmit light emitted by the keyboard signals from beneath wipeable keyboard cover 200 to an area where the light is more easily viewable by a user. Light transmitting elements 428 may be shaped to correspond to the keyboard signal beneath them. Housing 426 and light transmitting elements 428 may be composed of the same materials as membrane 102, frame 104, or composed of plastic, vinyl, polycarbonate, acrylic, glass or any other material commonly used to transmit light.

Figure 5:
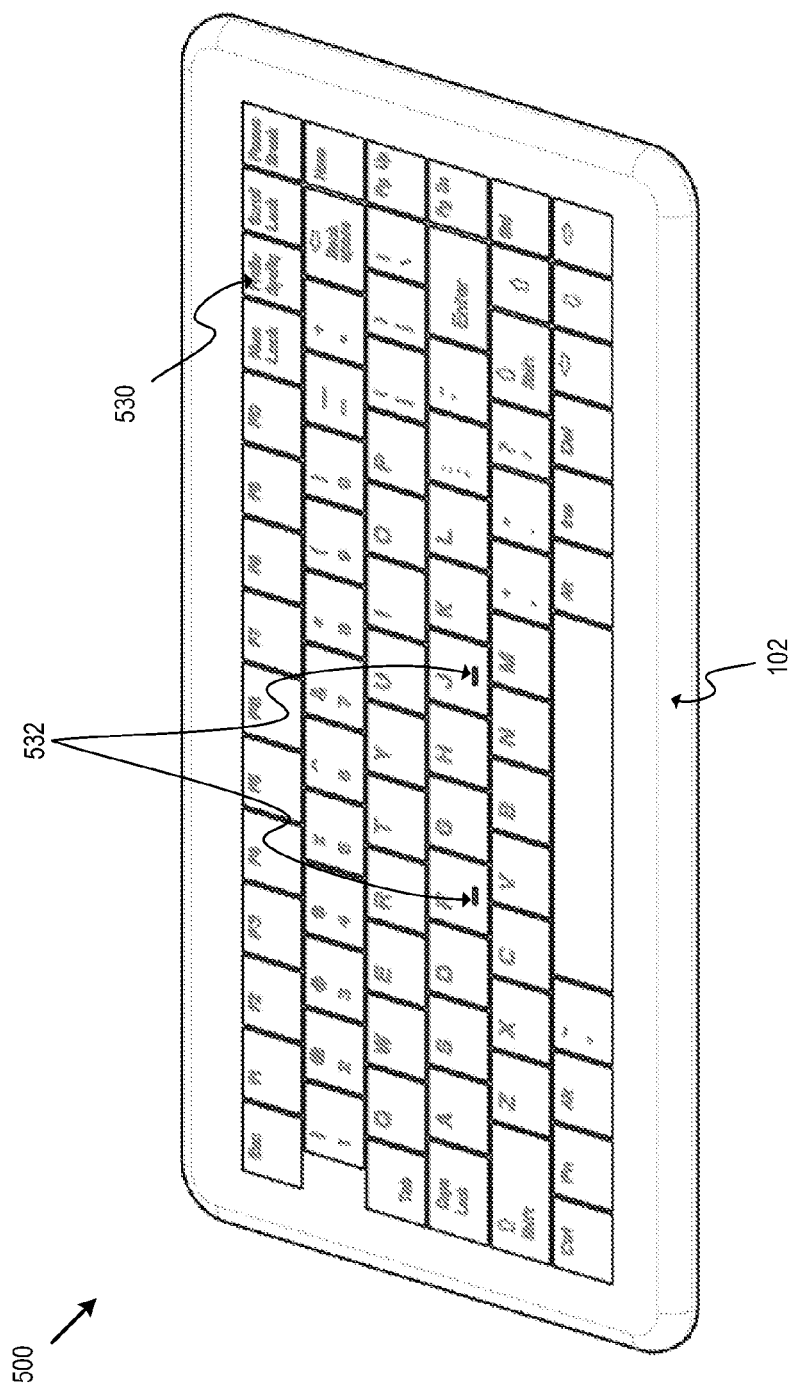
FIG. 5 is a perspective view of a wipeable keyboard cover according to another embodiment of the invention.

FIG. 5 shows a perspective view of another embodiment of the invention. Wipeable keyboard cover 500 may include some or all of the same elements as wipeable keyboard 100. Similar elements will be referred to using the designations from FIGS. 1A and 1B. Wipeable keyboard cover 500 may include a plurality of symbols 530 on membrane 102. Symbols 530 may be included on an outer surface of membrane 102 or an inner surface of membrane 102. Symbols 530 may correspond to the symbols on the keys located beneath symbols 530 when wipeable keyboard cover 500 is attached to a keyboard assembly. Symbols 530 may include, for example, letters, numbers, words, or any other symbol found on a keyboard assembly. Symbols 530 may be a foreign language translation of the corresponding symbols on the keys located beneath symbols 530 when wipeable keyboard cover 500 is attached to a keyboard assembly.

Symbols 530 may be secured to membrane 102 through any commonly known printing process, such a pad printing. Symbols 530 may be composed of the same material as membrane 102. For example, symbols 530 may be printed on a silicon membrane 102 using silicon ink. Alternatively, symbols 530 may be composed of a material dissimilar to membrane 102. Symbols 530 may also be raised protrusions formed on membrane 102.

Wipeable keyboard cover 500 may include index finger locators 532 on membrane 102. Index finger locators 532 may be protrusions configured to guide the placement of a user's hands over the keys of the keyboard assembly. For example, index finger locators 532 may be raised protrusions located to correspond to the "F" and "J" keys on a covered keyboard assembly for a typical QWERTY-style keyboard. The "F" and "J" keys are commonly the areas where users of QWERTY-style keyboards locate their index fingers while typing. Index finger locators 532 may be adapted for use with non-QWERTY-style keyboards. Index finger locators 532 may aid a user's typing ability while operating a keyboard assembly covered by wipeable keyboard cover 500.

Figure 6:
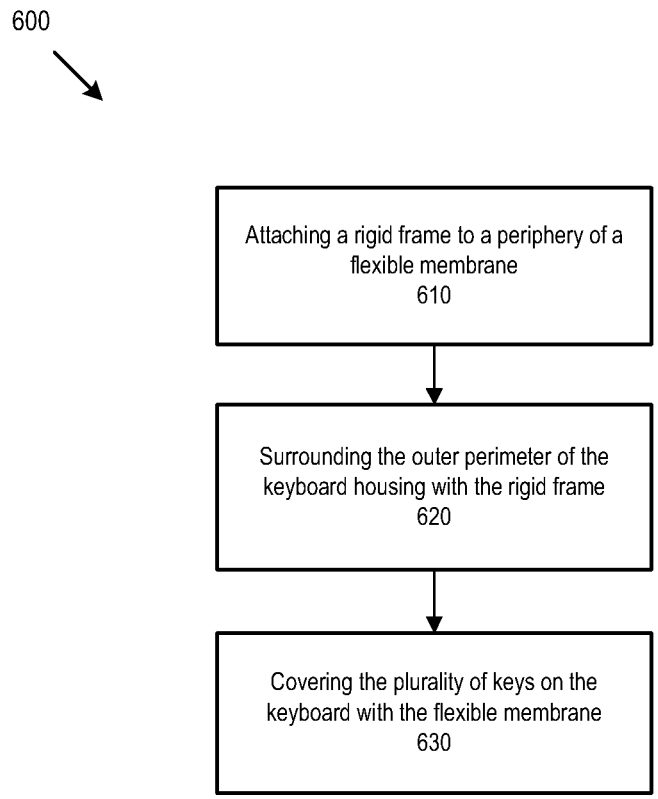
FIG. 6 is a flow diagram of a method for covering a keyboard assembly according to another embodiment of the invention.

FIG. 6 illustrates method 600 for covering a keyboard assembly having a plurality of keys and a housing. The method begins with step 610 in which a rigid frame is attached to a periphery of a flexible membrane. Step 620 involves surrounding the outer perimeter of the housing with the rigid frame. Step 630 involves covering the plurality of keys with the flexible membrane.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A cover for a keyboard assembly having a plurality of keys and a housing, the cover comprising:
    a membrane extending over the plurality of keys, wherein the membrane includes a channel along the periphery of the membrane, wherein the channel includes an opening facing the interior of the membrane, and wherein the membrane is flexibly adaptable to allow the keys to be depressed through the membrane; and
    a rigid frame attached to an entire periphery of the membrane, wherein the frame has a top and a plurality of sides connected to the top and an edge formed in an exterior of the plurality of sides, wherein the edge extends in a downward direction away from the top;
    wherein the membrane extends over the top of the frame and the membrane is attached to the plurality of sides of the frame by the edge inserted into the channel; and
    wherein the frame does not contact a bottom of the keyboard assembly.

2. The cover of claim 1 wherein the frame is configured to closely surround the outer perimeter of the housing and configured to attach removably to the keyboard assembly.

3. The cover of claim 2 wherein the membrane is substantially flat and contacts only a top surface of the plurality of keys.

4. The cover of claim 3 wherein the membrane is transparent or translucent.

5. The cover of claim 4 wherein the membrane is composed of a material comprising silicone, latex, or urethane.

6. The cover of claim 5 wherein the membrane is colored.

7. The cover of claim 4 wherein an outer membrane surface is smooth.

8. The cover of claim 4 wherein an outer membrane surface includes a coating comprising antimicrobial, slick, or ultraviolet protective.

9. The cover of claim 4 wherein the membrane includes symbols corresponding to symbols on the plurality of keys.

10. The cover of claim 9 wherein the symbols are foreign-language translations of the corresponding symbols on the plurality of keys.

11. The cover of claim 9 wherein the symbols are permanently fixed to the membrane.

12. The cover of claim 4 wherein the cover has an ingress protection rating of at least 54 when used in combination with the keyboard assembly.

13. The cover of claim 4 further comprising a plurality of ribs formed on a portion of the frame contacting the housing.

14. The cover of claim 13 wherein a portion of the plurality of ribs deform when the frame contacts the housing.

15. The cover of claim 14 wherein the frame attaches to the keyboard assembly with a snap fit.

16. The cover of claim 4 wherein the frame is composed of a material comprising polystyrene, polycarbonate, or acrylonitrile butadiene styrene.

17. The cover of claim 4 further comprising protrusions configured to guide the placement of a user's hands over the keys of the keyboard assembly.

18. The cover of claim 4 for a keyboard assembly having an indicator signal light, the cover further comprising a keyboard indicator signal viewer.

19. A method of creating a cover for a keyboard assembly having a plurality of keys and a housing, the method comprising:
    forming a rigid frame configured to surround the outer perimeter of the housing, wherein the frame has a top and a plurality of sides connected to the top and an edge formed in an exterior of the plurality of sides, wherein the edge extends in a downward direction away from the top; and
    attaching a periphery of a flexible membrane to the rigid frame by extending the membrane over the top of the frame and inserting the edge into a channel located at the periphery of the membrane, wherein the channel includes an opening facing the interior of the membrane, wherein the flexible membrane is configured to cover the plurality of keys.

* * * * *